United States Patent [19]

Niskanen

[11] Patent Number: 4,712,397
[45] Date of Patent: Dec. 15, 1987

[54] PARKLOCK CONTROL

[75] Inventor: Don L. Niskanen, Livonia, Mich.

[73] Assignee: Teleflex Incorporated, Limerick, Pa.

[21] Appl. No.: 22,649

[22] Filed: Mar. 6, 1987

[51] Int. Cl.⁴ .......................................... E05B 65/12
[52] U.S. Cl. ..................................... 70/248; 70/254
[58] Field of Search ............... 70/248, 247, 254, 256, 70/257, 237, 239; 74/483 R, 475, 878

[56] References Cited

U.S. PATENT DOCUMENTS

| | | | |
|---|---|---|---|
| 3,590,613 | 7/1971 | Kimberlin | 70/239 |
| 3,901,097 | 8/1975 | Williams | 74/475 |
| 4,235,123 | 11/1980 | Simancik | 74/475 |
| 4,270,624 | 6/1981 | Jessop | 74/483 R |
| 4,474,085 | 10/1984 | De Vogelare | 74/878 |
| 4,520,640 | 6/1985 | Kramer | 70/248 |
| 4,660,443 | 4/1987 | Simancik | 74/878 |
| 4,671,085 | 6/1987 | Yamaguchi | 70/248 |

*Primary Examiner*—Robert L. Wolfe
*Attorney, Agent, or Firm*—Reising, Ethington, Barnard, Perry & Milton

[57] ABSTRACT

A parklock assembly (10) for retaining the position of an automotive vehicle gear selector lever (22) in the park position while the vehicle key lock means (18) is in the off position and for allowing the gear selector lever (22) to move out of the park position while the key lock means (18) is in the on position. The assembly (10) includes a conduit (12) and a flexible motion transmitting core element (14) having first and second ends extending out of the conduit. A holding means (16) is slideably disposed about the first end of the core element (14) for engaging a projection (34) of the key lock means (18). The holding means (16) is urged by first biasing means (36) into the projection (34) when the key lock means (18) is in the off position. A terminal means (20) is fixedly disposed about the second end of the core element (14) and engages the gear selector lever (22). The assembly (10) is characterized by including second biasing means (24) for urging the terminal means (20) and the core element (14) to move relative to the conduit (12) in a direction longitudinally away from the first end.

11 Claims, 5 Drawing Figures

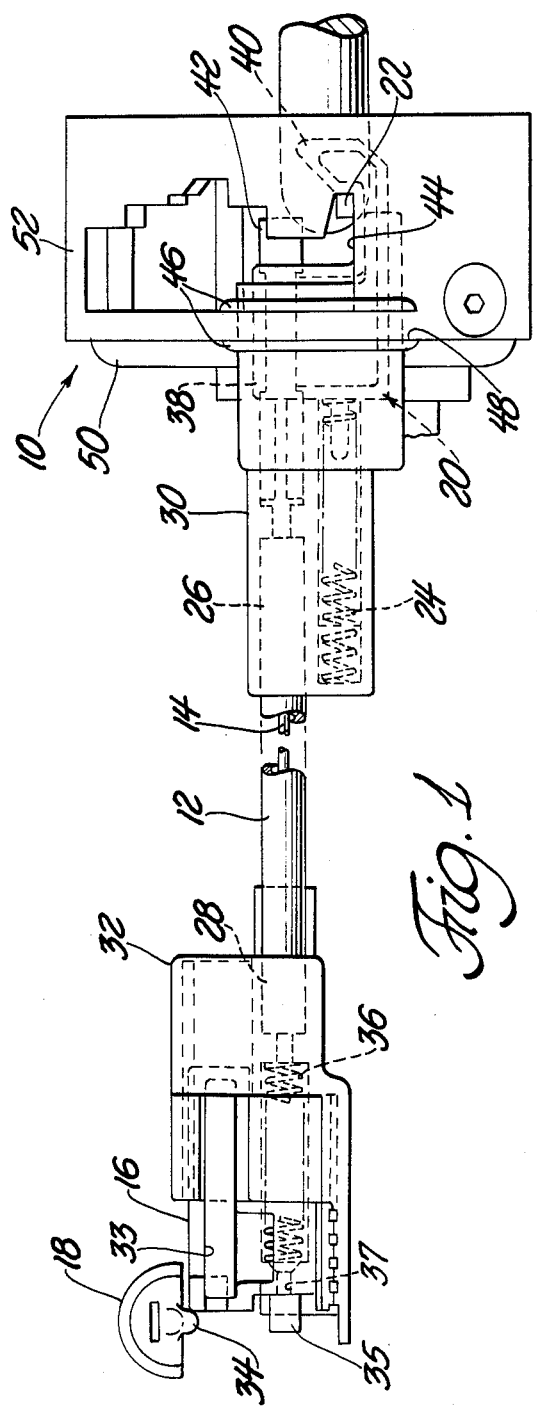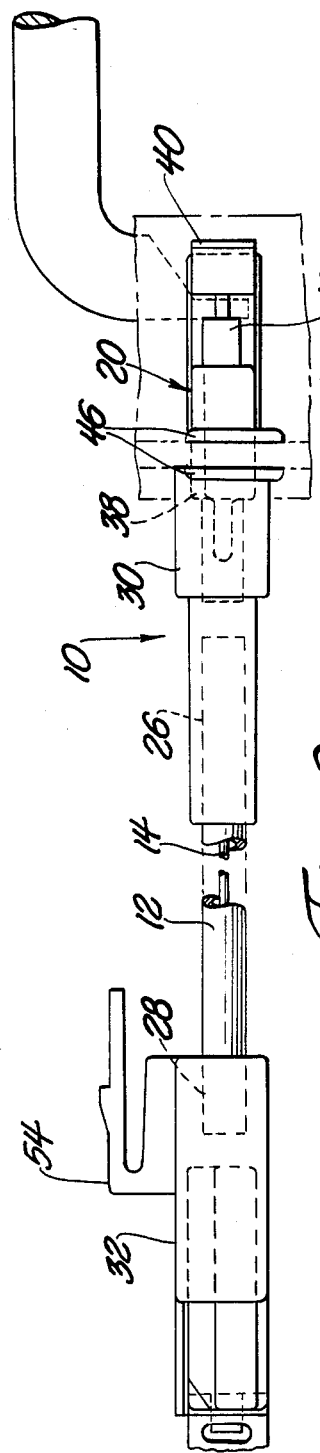

PARKLOCK CONTROL

TECHNICAL FIELD

This invention relates to parklock assembly for retaining a gear shift lever of an automotive vehicle with an automatic transmission in the park position when the vehicle key is in the off position. This prevents the vehicle from inadvertently being placed in gear when the automobile key is in the off position.

BACKGROUND ART

Prior art assemblies include a slider member engagable with a gear selector lever and a cassette member engagable with a key lock. The slider member and the cassette member are integrally connected by a core element. A gear selector lever is retained within a pocket defined by the slider member. The cassette member engages the projection of a key lock and prevents movement of the assembly when the key lock is in the off position. The cassette member is urged by a spring. When the key is moved to the on position, the spring moves the cassette member and the slider member to allow the gear selector lever to move out of the pocket and out of the park position. To return the assembly to the park position, the gear selector lever is manually moved into the pocket. The gear selector lever engages a finger on the slider member and pulls the slider member and the cassette back to the park position. The force provided by the gear selector lever to the finger must overcome the force of the spring acting on the cassette member to place the assembly in the park position.

In prior art assemblies, the slider member which defines the pocket is stamped metal. The stamped metal contains an extension which prevents the gear selector lever from being moved from the park position when the key is in the off position. If the user attempts to move the gear selector lever while the key is in the off position, the gear selector lever engages the extension. High forces can be transmitted to the extension since the gear selector lever has a long moment arm.

The prior art assemblies are deficient in that they tend to be damaged by forces transmitted to them by the gear selector lever when in an off position. In particular, the extension and slider become damaged by the forces applied to them by the gear selector lever. That is, prior art assemblies are not well adapted to prevent damage caused by forces transmitted to them by the gear selector lever.

STATEMENT OF THE INVENTION AND ADVANTAGES

According to the present invention, there is provided a parklock assembly for retaining the position of an automobile gear selector lever in the park position while the automobile key lock means is in the off position, and for allowing the gear selector lever to move out of the park position while the key lock means is in the on position. The assembly comprises a conduit, and a flexible motion transmitting core element having first and second ends supported for longitudinal movement in the conduit. The assembly further includes holding means slideably disposed on the first end of the core element for engaging the key lock means and for being retained in an off position when the key lock means is in the off position and moveable past the key lock means when the latter is in the on position. The assembly further includes first biasing means urging the holding means into engagement with the key lock means in the off position and into engagement with the first end of the core element in the on position. The assembly further includes terminal means attached to the second end of the core element for preventing movement of the selector lever when the key lock means is in the off position. The assembly is characterized by including second biasing means urging the core element and the terminal means out of and away from the second end of the conduit. The first biasing means provides a greater force than the second biasing means so that as the holding means is held in the off position by the key lock means, the terminal means is urged to the extreme extended position by the second biasing means and whereupon the first biasing means moves the holding means to the on position while retracting the terminal means and overpowering the second biasing means.

Accordingly, the present invention offers a biasing means which reduces the forces transmitted to the terminal means by the gear selector lever, thus reducing the potential of the assembly becoming damaged.

FIGURES IN THE DRAWING

Other advantages of the present invention will be readily appreciated as the same becomes better understood by reference to the following detailed description when considered in connection with the accompanying drawings wherein:

FIG. 1 is a side view of one preferred embodiment of the present invention;

FIG. 2 is a top view of the assembly shown in FIG. 1;

DETAILED DESCRIPTION OF THE PREFERRED DRAWINGS

Figure 3:
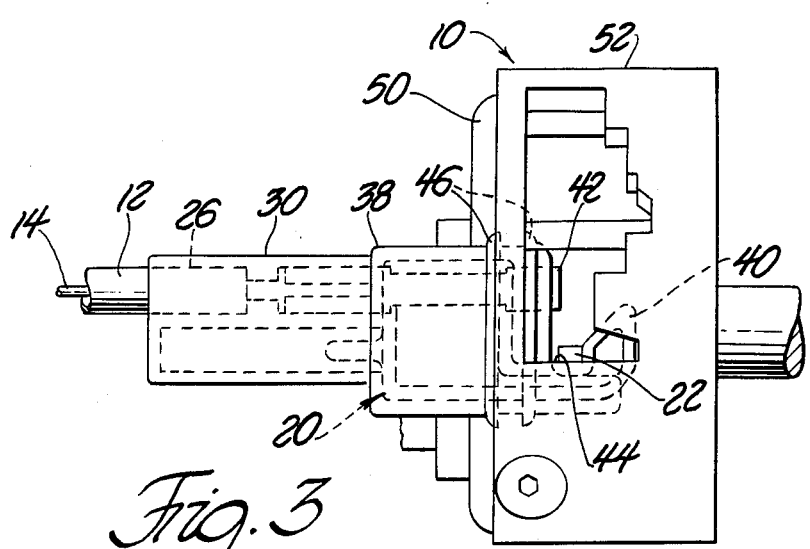
FIG. 3 is an enlarged view of the second end of the assembly.
Figure 4:
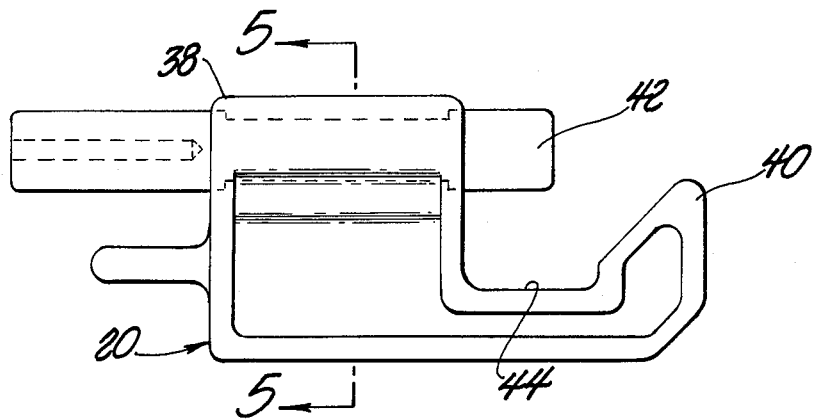
FIG. 4 is an enlarged view of the slider member of the present invention.
Figure 5:
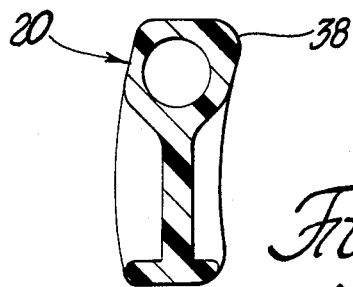
FIG. 5 is a cross-sectional view taken substantially along line 5—5 of FIG. 4.

A parklock assembly for retaining the position of an automotive vehicle gear selector lever in the park position while the vehicle key lock means is in the off position and for allowing the gear selector to move out of the park position while the key lock means is in the on position is generally shown at 10.

The assembly 10 includes a conduit 12 and a flexible motion transmitting core element 14 having first and second ends supported for longitudinal movement in the conduit 12. The assembly 10 includes holding means 16 at the first end of the core element for engaging the key lock means 18 for being retained in an off position when the key lock means 18 is in the off position and moveable past the key lock means 18 when the latter is in the on position. The assembly 10 further includes first biasing means 36 urging the holding means 16 into engagement with the key lock means 18 in the off position and into engagement with the first end of the core element 14 in the on position.

The assembly 10 further includes terminal means 20 attached to the second end of the core element 14 for preventing movement of the gear selector lever 22 when the key lock means 18 is in the off position.

The assembly is characterized by including second biasing means 24 urging the core element 14 and the terminal means 20 out of and away from the second end of said conduit 12. The first biasing means 36 provides a greater force than the second biasing means 24 so that as the holding means 16 is held in the off position by the key lock means 18, the terminal means 20 is urged to the extreme extended position by the second biasing means 24 and whereupon the first biasing means 36 moves the holding means 24 to the on position while retracting the terminal means 20 and overpowering the second biasing means 24.

More specifically, the conduit 12 includes a first end 28 and a second end 26 which coincide with the first end and the second end of the core element 14. A terminal housing 30 is attached to the second end 26 of the conduit 12. A primary housing 32 is attached to the first end 28 of the conduit 12. The terminal housing 30 and the primary housing 32 are made of an organic polymeric material and are molded about the respective ends of the conduit, providing a fixed connection between the conduit 12 and the respective housings 30, 32. The second biasing means 24 reacts between the terminal means 20 and the terminal housing 30 and urges the core element 14 out of the second end 26 of the conduit 12 in a direction longitudinally away from the first end 28 of the conduit 12 to the extreme extended position (as shown in FIG. 1). The assembly 10 further includes first biasing means 36. The first biasing means 36 reacts between the holding means 16 and the primary housing 32 and urges the core element 14 out of the first end 28 of the conduit 12 in a direction longitudinally away from the second end 26 of the conduit 12 while retracting the terminal means 20 and overpowering the second biasing means 24 (as shown in FIG. 3). The first and second biasing means 36, 24 comprise helical springs.

The holding means 16 is slideably supported by the primary housing 32. The holding means 16 comprises a cassette member 16 and is preferably made of an organic polymeric material. The holding means 16 is slideably disposed about the first end of the core element 14.

A slug 35 defines the first end of the core element 14 and is fixedly disposed about the core element 14. The slug is located on the outer surface of the holding means 16. The slug 35 keeps the core element 14 from sliding relative to the holding means 16 when the key lock means is in the on position. The slug 35 allows the holding means to slide relative to the core element 14 when in the off position. The first biasing 36 urges the holding means 16 into engagement with the slug 35 when in the on position.

The core element 14 extends through a channel 37 in the holding means 16. The core element 14 has the slug 35 fixedly disposed on the end thereof. The slug 35 is of greater diameter than the diameter of the channel 37. This provides a lost motion connection between the core element 14 and the holding means 16. When the key lock means 18 is in the off position, FIG. 1, and the user attempts to move the gear selector lever 22 into an operating position, the gear selector lever 22 will engage the terminal means 20 and move it against the biasing force of the second biasing means 24 (to the left as viewed in FIG. 1). This will move the core element 14 in a direction longitudinally away from the second end of the core element 14. Because the holding means 16 is slideably disposed about the core element 14, and is restrained by the key lock means 18, the core element 14 is allowed to slide relative to the holding means 16, only in the direction longitudinally away from the second end of the core element 14, thus providing for lost motion between the holding means 16 and the core element 14. The slug 35 in this case comes out of contact with the holding means 16. The slug 35 keeps the core element 14 from sliding relative to the holding means 16 when in the on position.

The holding means 16 contains a bore 33 therein. The bore 33 keeps the wall thickness of the holding means 16 constant. Since the holding means 16 and the primary housing 32 are both preferably made of an organic polymeric material, the holding means 16 can slide easily relative to the primary housing 32.

The holding means 16 engages a projection 34 on the key lock means 18 when the key lock means 18 is in the off position (as shown in FIG. 1). The first biasing means 36 urges the holding means 16 into the slug 35 and moves the core element 14 longitudinally in the opposite direction to and against the urging of the second biasing means 24 when the key lock means 18 is in the on position (shown in phantom in FIG. 1). As the key lock means 18 is turned to the on position, the projection 34 is drawn upwardly and out of engagement with the holding means 16. The first biasing means 36 provides greater biasing forces than the second biasing means 24 so that the core element 14 is moved in opposition to the second biasing means 24 by the first biasing means 36 when the key lock means is moved to the on position. Thus, the first biasing means 36 urges the holding means 16 and the core element 14 to the left as viewed in FIG. 1. In this on position, the projection 34 is on top of the holding means 16 and cannot drop to the off position.

The terminal means 20 includes the slider member 38. The slider member 38 is fixedly disposed about the second end of the core element 14. The slider member 38, the core element 14, and the slug 35 are integrally connected. Therefore, movement imparted to the slug 35 will cause equal movement to be imparted to the slider member 38. Similarly, movement imparted to the slider member 38 will cause equal movement to be imparted to the slug 35.

The slider member 38 has a finger 40. The terminal means 20 also includes a retaining pin 42 which defines the second end of the core element 12. The finger 40, the slider member 38, and the retaining pin 42 define a pocket 44 for receiving the gear selector lever 22. The slider member 38 is slideably supported by the terminal housing 30. The slider member 38 and the terminal housing 30 are preferably made of an organic polymeric material. This allows the slider member 38 to slide easily within the terminal housing 30.

The retaining pin 42 is preferably made of stainless steel to prevent harm to the terminal means by compressive forces transmitted thereto by the metal gear selector lever 22 when the key lock means 18 is in the off position. As shown in FIG. 1, if the gear selector lever 22 is manually moved while the key lock means 18 is in the off position, the end of the gear selector lever 22 may engage the retaining pin 42. Since the gear selector lever has a long moment arm, high compressive forces can be transmitted to the pin 42. Because the pin is made of stainless steel it can withstand such compressive forces without incurring any damage.

The terminal housing 30 includes a plurality of spaced flanges 46 defining a groove 48 for disposition between a shift gate 50 and a shift bracket 52. The terminal housing 30 is frictionally engaged between the shift gate 50 and the shift bracket 52. The shift gate 50 and the shift bracket 52 define a plurality of positions in which the gear selector lever 22 may be moved. The primary housing 32 includes an abutting portion 54 for retaining the primary housing 32.

In operation, the assembly 10 is initially in the off position as shown in FIG. 1. In the off position the projection 34 engages the holding means 16 and prevents longitudinal movement of the holding means 16. The slug 35 is biased into engagement with the holding means 16 by the second biasing means 24. The gear selector lever 22 is retained within the pocket 44 defined by the pin 42 and the finger 40 to prevent movement of the gear selector lever 22 out of the park position. As the key locking means 18 is moved to the on position, as shown in phantom in FIG. 1, the projection 34 is drawn upwardly and the first biasing means 36 overcomes the force of the second biasing means 24 and urges the holding means 16 into engagement with the slug 35. The slug is moved to the left as viewed in FIG. 1 by the force of the first biasing means 36. This motion is transmitted to the slider member 38 through the core element, causing the slider member 38 to be retracted and moved to the left or the on position, as viewed in FIG. 3. This movement draws the retaining pin 42 to the left and allows the gear selector lever 22 to be manually moved past the pin 42 and into any desired operating position defined by the shift gate 50 and the shift braket 52. In this on position the projection 34 cannot drop to the off position. To return the key lock means 18 to the off position, the gear selector lever 22 is manually moved back to the park position. The gear selector lever 22 engages the finger 40 and pulls it to the right as viewed in FIG. 1. The second biasing means 24 also urges the slider member 38 to the right as viewed in FIG. 1. The second biasing means 24 also urges the slider member 38 to the right to the extreme extended position. This urging reduces the amount of force transmitted to the finger 40 by the gear selector lever 22. The holding means 16 is drawn past the projection 34 of the key lock means 18 by the movement of the slider member 38, since the slider member 38, core element 14, and slug 35 are integrally connected. The slug 35 engages the holding means 16 and draws it to the right. The force applied by the gear shift lever 22 overcomes the urging force of the first biasing means 36. The key lock means 18 can then be turned to the off position and the projection 34 can move back to the off position.

If the gear selector lever 22 is moved while the key lock means 18 is in the off position, the lever 22 will engage the slider 38. The slider 38 can move slightly against the urging of the second biasing means 24 if the force applied by the gear selector is greater than the urging force of the second biasing means 24. The movement is not great enough to retract the pin sufficiently to allow the gear selector lever 22 to move out of the pocket 44. The movement results in the core element 14 to move in a direction longitudinally away from the second end 18 of the conduit 12, (to the left as viewed in FIG. 1). Since the holding means 16 is slideably disposed about the core element 14, and the holding means is restrained by the projection 34, the core element 14 moves in a direction longitudinally away from the second end 26 of the conduit 12. The slug 35 comes out of engagement with the holding means 16. This eliminates a destructive compressive force from being introduced to the assembly 10 by the gear selector lever 22.

When the manual force applied by the gear selector lever 22 is removed, the second biasing means 24 urges the slider member 38 to the extreme extended position. This movement, in turn, draws the slug 35 back into engagement with the holding means 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A park lock assembly (10) for retaining an automobile gear selector lever (22) in the park position while the automobile key lock means (18) is in the off position and for allowing the gear selector lever (22) to move out of the park position while the key lock means (18) is in the on position, said assembly (10) comprising; a conduit (12), a flexible motion transmitting core element (14) having first and second ends supported for longitudinal movement in said conduit (12), holding means (16) slideably disposed on said first end (35) of said core element (14) for engaging the key lock means (18) for being retained in an off position when the very lock means (18) is in said off position and movable past the key lock means (18) when the latter is in the on position, first biasing means (36) urging said holding means (16) into engagement with the key lock means (18) in the off position and into engagement with said first end (35) of said core element (14) in the on position, terminal means (20) attached to said second end (42) of said core element (14) for preventing movement of the selector lever (22) when the key lock means (18) is in the off position, said assembly characterized by including second biasing means (24) urging said core element (14) and said terminal means (20) out of and away from said second end of said conduit (12), said first biasing means (36) providing a greater force than said second biasing means (24), said terminal means (20) is urged to the extreme extended position by said second biasing means (24) and whereupon said first biasing means (36) moves said holding means (16) to the on position while retracting said terminal means (20) and overpowering said second biasing means (24).

2. An assembly as set forth in claim 1 further characterized by said core element (14) including a slug (35) fixedly disposed on said first end thereof.

3. An assembly as set forth in claim 2 further characterized by said holding means (16) having a channel (37) therethrough in which said core element (14) is slideably disposed, said channel (37) having a smaller diameter then said slug (35) for allowing relative movement between said core element (14) and said holding means (16).

4. An assembly as set forth in claim 3 further characterized by said conduit (12) including first and second ends (26, 28) and by including a terminal housing (30) attached to said second end (26) of said conduit (12) and a primary housing (32) attached to said first end (28), said second biasing means (24) reacting between said terminal means (20) and said terminal housing (30) for urging said core element (14) out of said second end (26) of said conduit (12), said first biasing means (36) reacting between said holding means (16) and said primary housing (32) for urging said core element (14) out of said first end (28) of said conduit (12).

5. An assembly as set forth in claim 4 further characterized by said first biasing means (36) having a greater biasing force than said second biasing means (24) so that said core element (14) is moved in opposition to said second biasing means (24) by said first biasing means (36) when the key lock means (18) is in the on position.

6. An assembly as set forth in claim 5 further characterized by said terminal means (20) including a slider member (38) having a finger (40) and a retaining pin (42), said finger (40) and said retaining pin (42) defining a pocket (44) for receiving the gear selector lever (22), said slider member (38) being slideably supported by said terminal housing (30).

7. An assembly as set forth in claim 6 further characterized by said slider member (28) being made of an organic polymeric material, said retaining pin (42) being made of polished stainless steel.

8. An assembly as set forth in claim 7 further characterized by said slider member (38) being fixedly disposed about said second end of said core element (14).

9. An assembly as set forth in claim 8 further characterized by said terminal housing (30) including a plurality of spaced and parallel flanges (46) defining a groove (48) for mounting said terminal housing (30).

10. An assembly as set forth in claim 9 further characterized by said first and said second biasing means (36, 24) comprising springs.

11. A park lock assembly (10) for retaining the position of an automobile gear selector lever (22) in the park position while the automobile key lock means (18) is in the off position, said assembly (10) comprising; a conduit (12), a flexible motion transmitting core element (14) having first and second ends supported for longitudinal movement in said conduit, a gear selector lever (22), key lock means (18) for moving between an on and an off position, holding means (16) attached to said first end of said core element (14) for preventing longitudinal movement of said core element (14) when said key lock means (18) is in said off position, a first spring (36) urging said holding means (16) into engagement with the key lock (18) in the off position and into engagement with said first end (35) of said core element (14) in the on position, and terminal means (20) at said second end of said core element (14) for engaging said gear selector lever (22) and prohibiting movement of the same when said key lock means (18) is in said off position; said assembly (10) characterized by including a second spring (24) urging said terminal means (20) out of and away from said second end of said conduit (12), said first spring (36) providing a greater force than said second spring (24), said terminal means (20) is urged to the extreme extended position by said second spring (24) and whereupon said first spring (36) moves said holding means (16) to the on position while retracting said terminal means (20) and overpowering said second spring (24).

* * * * *

Disclaimer 4,712,397.—*Don L. Niskanen,* Livonia, Mich. PARKLOCK CONTROL. Patent dated Dec. 15, 1987. Disclaimer filed Apr. 6, 1989, by the assignee, Teleflex Inc.

Hereby enters this disclaimer to claims 1 and 2 of said patent.

[ *Official Gazette June* 6, 1989 ]